United States Patent [19]

Hartman

[11] Patent Number: 4,964,760
[45] Date of Patent: Oct. 23, 1990

[54] DOCK BUMPER GUARD

[76] Inventor: Thomas J. Hartman, 4763 N. Idlewild, Whitefish Bay, Wis. 53211

[21] Appl. No.: 441,192

[22] Filed: Nov. 22, 1989

Related U.S. Application Data

[63] Continuation of Ser. No. 264,029, Oct. 28, 1988, abandoned.

[51] Int. Cl.⁵ .............................................. E02B 3/26
[52] U.S. Cl. .................................... 405/215; 114/219
[58] Field of Search ........................ 405/211, 212, 215; 114/219

[56] References Cited

U.S. PATENT DOCUMENTS

| | | | |
|---|---|---|---|
| 2,926,904 | 3/1960 | Erlbacher | 405/215 X |
| 2,935,855 | 5/1960 | Reid | 405/215 |
| 3,449,917 | 6/1969 | Roskopf | 405/215 |
| 3,498,252 | 3/1970 | Peacock | 61/48 |
| 3,503,600 | 3/1970 | Rich | 114/219 |
| 3,574,379 | 4/1971 | Jordan | 293/71 |
| 3,593,531 | 7/1971 | Saadeh | 114/219 X |
| 3,741,598 | 6/1973 | Novak et al. | 293/71 |
| 3,950,953 | 4/1976 | Matthews | 405/215 |
| 4,215,952 | 8/1980 | Baardsen | 405/211 |
| 4,227,832 | 10/1980 | Leone et al. | 405/215 |
| 4,258,641 | 3/1981 | Wakamiya | 114/219 |
| 4,267,792 | 5/1981 | Kimura et al. | 114/219 |
| 4,285,616 | 8/1981 | Evetts | 405/215 |
| 4,351,257 | 9/1982 | Brown, Jr. | 114/219 |
| 4,433,942 | 2/1984 | Russell et al. | 405/215 |

FOREIGN PATENT DOCUMENTS

| | | | |
|---|---|---|---|
| 3224123 | 12/1983 | Fed. Rep. of Germany | 405/212 |
| 55-4441 | 1/1980 | Japan | 405/215 |

OTHER PUBLICATIONS

Advertising brochure distributed by W. H. Salisbury & Co., Skokie, Illinois, pp. 8 and 9.

Primary Examiner—Randolph A. Reese
Assistant Examiner—Arlen L. Olsen

[57] ABSTRACT

A bumper guard for protecting a boat at a dock includes a longitudinal body composed of molded urethane, a fastener extending through at least one opening formed in the body for fastening the body to a dock, and a reinforcing disk molded into the body at the location of each opening. The reinforcing disk is engageable by the fastener to prevent the fastener from pulling through the opening during fastening of the body to the dock.

7 Claims, 1 Drawing Sheet

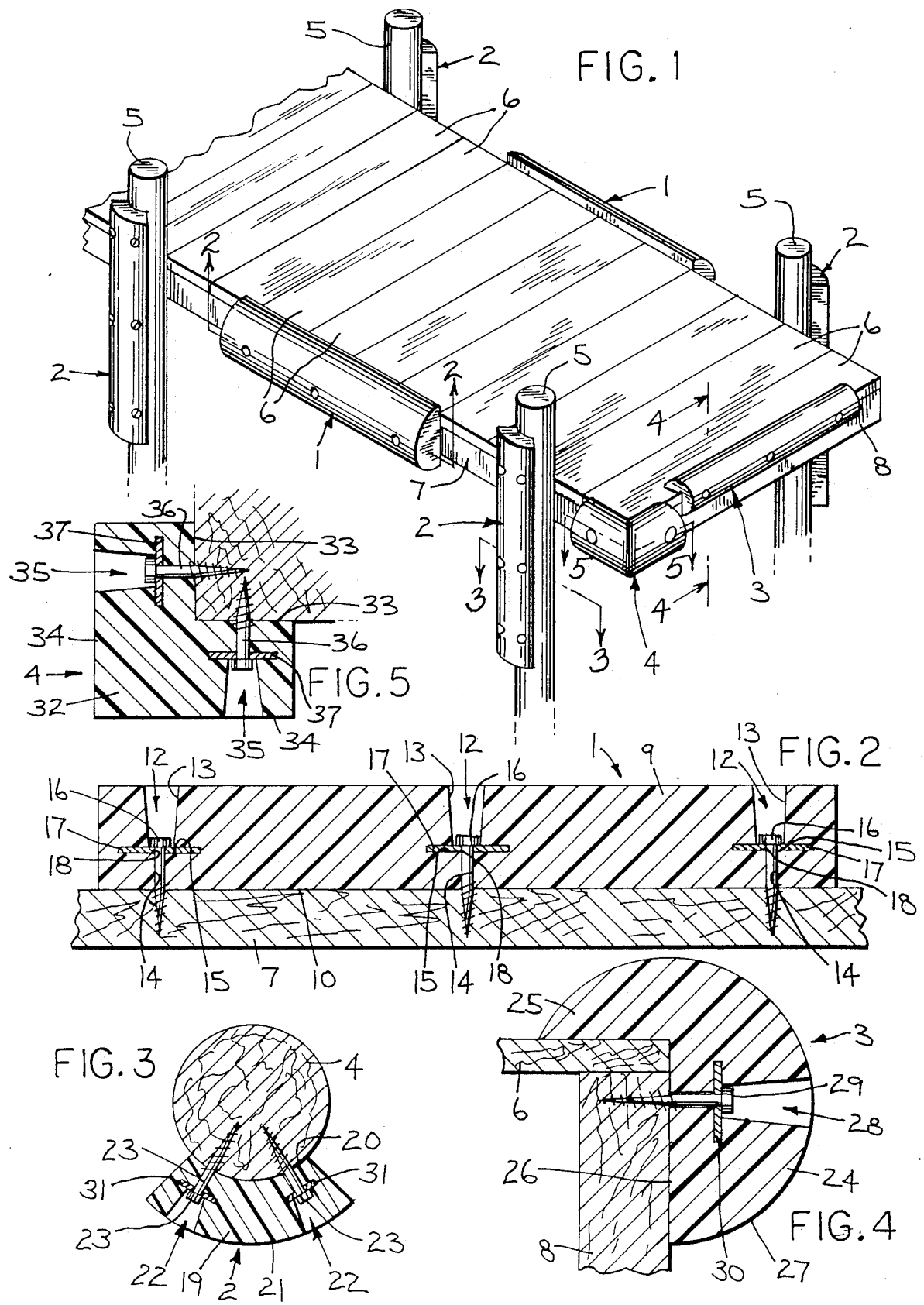

DOCK BUMPER GUARD

This is a continuation of application Ser. No. 07/264,029, filed Oct. 28, 1988.

BACKGROUND OF THE INVENTION

The present invention relates to bumper guards, and more particularly to a bumper guard for protecting a boat at a dock.

Various devices have been employed for attempting to protect a boat from being scratched, dented or otherwise damaged when a boat approaches or is moored at a dock or pier. One such device comprises a sealed plastic tubular cushion attached at one end to a rope which in turn is tied to some portion of the boat. When docking, the occupants of a boat typically throw out these tubular cushions so that they hang over the edge of the boat to protect the boat from piles or other supporting structure of a pier or dock. Unfortunately, such tubular cushions often collapse or "blow out" due to fatigue of the material thus reducing their protective capability.

Another type of device comprises an extrusion molded solid hard rubber bumper attached to a dock or pier. Such devices include a longitudinal body having a pair of opposite laterally extending side flanges through which nails or other fastening devices are driven to attach the device to a dock or pier. Oftentimes, however, because of its solid hard rubber composition, the device would tear away from the fasteners due to constant pressure by the boat. Also, such devices had little cushioning effect since they are made of a hard dense solid rubber material. Furthermore, such devices would "scuff" the gel coat of the boat due to the hardness of the rubber.

SUMMARY OF THE INVENTION

A bumper guard for protecting a boat at a dock. The bumper guard includes a flexible, resilient, longitudinal body, a fastener means for fastening the body to a dock, and reinforcing means in the body for reinforcing the body at the location of the fastener means.

The longitudinal body includes a dock-engaging surface on one longitudinal side thereof, a boat-engaging surface on the opposite longitudinal side thereof, and at least one opening extending therethrough between its opposite surfaces. The fastener means is disposed in and extends through the body opening, and the reinforcing means is engageable by the fastener means to prevent the fastener means from pulling through the body opening during fastening.

In one embodiment, the dock-engaging surface of the bumper guard is substantially planar and the boat-engaging surface is substantially arcuate in shape. In this form the bumper guard is typically mounted horizontally to the sides or front of a dock or pier. Alternately, a corner bumper guard may be formed in this shape which extends around and covers a corner of a dock or pier. In another embodiment, both the dock-engaging surface and the boat-engaging surface are arcuate shaped and concentric to one another. In this form the bumper guard is typically mounted vertically to the supporting pilings of a dock or pier. In still another embodiment, the body of the bumper guard includes a lip portion extending laterally therefrom and preferably extends laterally and longitudinally along the length of the dock-engaging surface of the body. In this form the bumper guard is typically mounted horizontally to the sides or front of a dock or pier.

The reinforcing means includes a disk-shaped member having a central opening formed therethrough disposed coincident with the body opening. The disk-shaped member not only prevents the fastener from pulling through the body opening during fastening, but also aids in preventing the fastener from tearing or ripping free from the body of the bumper guard since it distributes the load created by the fastener over a large area of the body.

The body opening includes a first portion communicating with the boat-engaging surface, a second portion communicating with the dock-engaging surface, the first and second portions having different diameters, and a shoulder portion therebetween with the disk-shaped member disposed at the shoulder portion. This enables the head of the fastener to be recessed from the boat-engaging surface to prevent it from scratching the boat finish. Preferably, the first portion of the body opening is cone-shaped and converges toward the shoulder portion to provide for ease of assembly. The body is preferably composed of a urethane material, but other flexible, resilient material may be utilized. Such material distributes the load on impact of a boat and urethane material, which is preferred, spreads out on impact to cover and seal off the top or head of the fastener. Additionally, such materials allow the bumper guard to conform to nonuniform surfaces which typically occur at dock and pier locations.

BRIEF DESCRIPTION OF THE DRAWINGS

The drawings illustrate the best mode presently contemplated of carrying out the invention.

In the drawings:

FIG. 1 is a perspective view of a dock incorporating four different embodiments of bumper guards constructed in accordance with the principles of the present invention;

FIG. 2 is a cross sectional side view in elevation taken along the plane of the line 2—2 in FIG. 1 of a first embodiment of the bumper guard;

FIG. 3 is a cross sectional view taken along the plane of the line 3—3 in FIG. 1 of a second embodiment of the bumper guard of the present invention;

FIG. 4 is a cross sectional view taken along the plane of the line 4—4 in FIG. 1 of a third embodiment of the bumper guard of the present invention; and FIG. 5 is a cross sectional view taken along the plane of the line 5—5 in FIG. 1 of a fourth embodiment of the bumper guard of the present invention.

DESCRIPTION OF THE PREFERRED EMBODIMENTS

Referring now to the drawings, FIG. 1 illustrates a dock or pier incorporating four different embodiments of the bumper guard of the present invention generally designated by the numerals 1, 2, 3 and 4 respectively. As illustrated, the dock or pier includes a plurality of spaced vertically extending piles 5 supporting a platform therebetween. The platform is composed of a plurality of slats 6 supported by a pair of opposite side joists 7 (only one of which is shown) and a front or end joist 8. Thus, as illustrated in FIG. 1, bumper guard 1 of the first embodiment may be utilized horizontally between piles 5 on the side edges of the platform while bumper guard 2 of the second embodiment may be employed vertically on the piles 5 themselves with bumper guard 3 of the third embodiment extending horizontally along the front edge of the platform, and bumper guard 4 of the fourth embodiment extending horizontally to wrap around and cover a corner of the platform. It should be noted, however, that the positions of bumper guards 1, 2, 3 and 4 noted above are for illustration purposes only, and thus guards 1, 2, 3 and 4 may be employed at other locations along docks or piers (with the possible exception of corner guard 4) depending upon the particular structural features and dimensions thereof.

Referring now to FIGS. 1 and 2, bumper guard 1 includes a longitudinal body 9 composed of a flexible resilient material, preferably molded urethane. Other materials may also be employed so long as they are sufficiently flexible and resilient to cushion a boat at a dock to prevent damage thereto and yet sufficiently rigid to permit attachment to the dock or pier. For example, instead of being a solid body filled with urethane as illustrated, body 9 may be in the form of a shell filled with air or other cushioning material. Body 9 includes a dock-engaging surface 10 on one longitudinal side thereof and a boat-engaging surface 11 on an opposite longitudinal side thereof. Dock-engaging surface 10 is substantially planar in shape while boat-engaging surface 11 is substantially arcuate in shape so that in cross section body 9 is hemispherically shaped.

Body 9 includes a plurality of openings 12 formed therethrough extending between surfaces 10 and 11. Openings 12 extend substantially laterally with respect to the longitudinal dimension of body 9. Each opening 12 includes a first portion 13 communicating with or opening to boat-engaging surface 11, a second portion 14 communicating with or opening to dock-engaging surface 10, and a shoulder portion 15 formed therebetween. Second portion 14 is of uniform diameter throughout its length, and such diameter is less than the diameter of first portion 13, as shown best in FIG. 2. Preferably, first portion 13 is cone-shaped and converges toward the shoulder portion 15. This enables a tool such as a socket for a wrench to readily be inserted and removed in portions 13 of openings 12.

Bumper guard 1 also includes a fastener 16 preferably in the form of a lag screw, for fastening body 9 to side joists 7. As shown best in FIG. 2, fasteners 16 are disposed in and extend through openings 12 with their heads located adjacent shoulder portions 15 and their shanks extending through portions 14 of openings 12.

In order to prevent the head of lag screw 16 from pulling through openings 12 in body 9, there is provided reinforcing means in body 9 and the location of openings 12. More specifically, the reinforcing means comprises a disk-shaped member 17 having a central opening 18 formed therethrough disposed coincident with the longitudinal axis of openings 12. Central opening 18 has a sufficient diameter to permit passage therethrough of the shank of screw 16, but insufficient diameter to permit the passage of the head of screw 16 therethrough. Preferably, central opening 18 has a diameter substantially equal to the diameter of portion 14 of openings 12. Although disk-shaped members 17 are preferably round, they may also be formed of different shapes, such as square, rectangular, pentagonal, hexagonal, octagonal, and the like. Thus, the term "disk-shaped" is intended to include shapes in addition to the circular shape illustrated. Preferably, members 17 are integrally molded within body 9 during the manufacturing process.

In operation, in order to mount bumper guard 1 on side joist 7 of the platform, lag screws 16 are inserted through openings 12 and are turned down into side joist 7 until their heads engage members 17. Further turning securely mounts bumper guard 1 to side joist 7 without stripping or tearing screw 16 through body 9 since members 17 spread the load or force created during the fastening operation and distributes such load or force across a wide area of body 9.

Referring now to FIGS. 1 and 3, there is illustrated bumper guard 2 comprising a second embodiment of the present invention. Bumper guard 2 is identical to bumper guard 1 in all respects except for its shape, orientation and the number of lag screws employed. More specifically, bumper guard 2 includes a longitudinal body 19 having an arcuate shaped dock-engaging surface 20 on one longitudinal side thereof and a parallel arcuate shaped boat-engaging surface 21 on an opposite longitudinal side thereof. Arcuate surface 20 thus conforms substantially to a corresponding portion of the shape of the outer surface of a pile 4. Body 19 also includes a plurality of openings 22 extending therethrough identical in all respects with respect to the openings 12 of bumper guard 1 except that there are six openings 22 instead of three openings 12 with each opening 22 extending radially with respect to the longitudinal axis of pile 4, as best shown in FIG. 3. Although illustrated as being circumferentially adjacent one another in FIG. 3, openings 22 may also be arranged in staggered form through body 19. Also, although illustrated with six openings 22, there may be more or less openings 22 depending upon the particular application. As with bumper guard 1, bumper guard 2 employs a plurality of lag screws 23 extending through openings 22 for fastening bumper guard 2 to piles 4. Additionally, bumper guard 2 includes a plurality of disk-shaped members 31 for reinforcing body 19 which are identical to disk-shaped members 17 of bumper guard 1.

Referring now to FIGS. 1 and 4, there is illustrated a bumper guard 3 in accordance with a third embodiment of the present invention. Bumper guard 3 is intended for use in connection with an edge of a dock or pier and comprises a longitudinal body 24 substantially similar to body 9 of bumper guard 1 except that body 24 includes a lip portion 25 extending laterally therefrom. More particularly, lip portion 25 projects from a dock-engaging surface 26 of body 24 and extends laterally and longitudinally along the length of body 24 along the top edge thereof. Thus, as best shown in FIG. 4, dock-engaging surface 26 is L-shaped while boat-engaging surface 27 is arcuate shaped. Body 24 includes three openings 28 formed therethrough identical to openings 12 and 22 for receiving lag screws 29 for fastening body 24 to end joist 8 of the platform. Bumper guard 3 also includes a plurality of disk-shaped members 30 for reinforcing body 24 which are identical to disk-shaped members 17 of bumper guard 1. Thus, bumper guard 3 is supported not only by the outer surface of end joist 8 but also by the top surface of a slat 6 to provide sufficient protection for a boat.

Referring now to FIGS. 1 and 5, there is illustrated a bumper guard 4 in accordance with a fourth embodiment of the present invention. Bumper guard 4 is intended for use in connection with a corner of a dock or pier and comprises a longitudinal body 32 substantially similar to body 9 of bumper guard 1 except that body 32 includes two integral portions extending at 90° to one another. As best shown in FIG. 5, dock-engaging surface 33 is planar while boat-engaging surface 34 is arcuate shaped. Body 32 includes two openings 35 formed therethrough identical to openings 12 and 22 for receiving lag screws 36 for fastening body 32 to end joist 8 and side joist 7 of the platform. Bumper guard 4 also includes a plurality of disk-shaped members 37 for reinforcing body 32 which are identical to disk-shaped members 17 of bumper guard 1. Thus, bumper guard 4 is supported not only by the outer surface of end joist 8 but also by the outer surface of side joist 7 to provide sufficient protection for a boat.

Various modes of carrying out the invention are contemplated as being within the scope of the following claims particularly pointing out and distinctly claiming the subject matter regarded as the invention.

I claim:

1. A bumper guard for protecting a boat at a dock, comprising, in combination:
    (a) a resilient longitudinally extending body, said body having a dock-engaging surface on one longitudinal side thereof and having a boat-engaging surface on an opposite longitudinal side thereof,
    (b) cushioning means disposed between said surfaces for cushioning the impact of a boat coming into contact therewith,
    (c) at least one body opening extending through said cushioning means between said surfaces, said opening including:
        (1) a first portion having an inner end and having an outer end communicating with said boat-engaging surface,
        (2) the said inner end of said first portion merging into a second portion communicating between the area of merger with said first portion and said dock-engaging surface, and with said second portion being of smaller diameter than said first portion,
        (3) a shoulder portion at the area of merger between said first and second portion,
    (d) reinforcing means disposed in said body and positioned adjacent the shoulder portion at said area of merger and being retained therein by a surface of said cushioning means opposite said shoulder portion, said reinforcing means having a diameter larger than that of said second portion,
    (e) and fastener means disposed in and extending through said opening and said reinforcing means for tighteningly fastening said body to a dock, said fastener means including an enlarged portion engageable with said reinforcing means during said fastening of said body to a dock,
    (f) said reinforcing means, during said fastening, forming means to prevent said enlarged portion of said fastener means from pulling through said second portion of said opening.

2. The bumper guard of claim 1 wherein said dock-engaging surface is substantially planar and said boat-engaging surface is substantially arcuate in shape.

3. The bumper guard of claim 1 wherein said dock-engaging surface and said boat-engaging surface are parallel to each other.

4. The bumper guard of claim 3 wherein both said dock-engaging surface and said boat-engaging surface are arcuate shaped and concentric to one other.

5. The bumper guard of claim 1 wherein said body further includes a lip portion extending laterally therefrom.

6. The bumper guard of claim 5 wherein said lip portion projects from said dock-engaging surface and extends longitudinally along the length of said body.

7. The bumper guard of claim 1 wherein said reinforcing means comprises a disk-shaped member having a central opening formed therethrough disposed coincident with said body opening.

* * * * *